United States Patent [19]

Muramatsu

[11] Patent Number: 4,724,826
[45] Date of Patent: Feb. 16, 1988

[54] SOLAR WATER HEATER INCORPORATING HEAT PIPE

[75] Inventor: Toshiaki Muramatsu, Oyama, Japan
[73] Assignee: Showa Aluminum Corporation, Osaka, Japan
[21] Appl. No.: 907,360
[22] Filed: Sep. 15, 1986

[30] Foreign Application Priority Data

Sep. 18, 1985 [JP] Japan .................................. 60-207489

[51] Int. Cl.⁴ ................................................. F24J 2/32
[52] U.S. Cl. ..................................... 126/433; 126/437; 126/444; 126/450; 165/133; 165/170
[58] Field of Search ............... 126/433, 437, 444, 445, 126/447, 450, 449; 165/133, 134.1, 135, 170; 220/66, 67, 368

[56] References Cited

U.S. PATENT DOCUMENTS

| | | | |
|---|---|---|---|
| 2,550,174 | 4/1951 | Towner | 165/170 X |
| 3,405,439 | 10/1968 | Uemura | 29/509 |
| 3,409,168 | 11/1968 | Chmielowiec | 220/67 |
| 3,960,208 | 6/1976 | Anthony et al. | 165/1 |
| 4,235,287 | 11/1980 | Kleine et al. | 165/170 |
| 4,311,131 | 1/1982 | Sabet | 126/433 |
| 4,355,629 | 10/1982 | Cornell, III | 126/437 |
| 4,513,732 | 4/1985 | Feldman, Jr. | 126/433 |
| 4,558,736 | 12/1985 | Ziemek | 165/183 |

FOREIGN PATENT DOCUMENTS 59-153072  8/1984  Japan ................................. 126/433

*Primary Examiner*—Samuel Scott
*Assistant Examiner*—Allen J. Flanigan
*Attorney, Agent, or Firm*—Armstrong, Nikaido, Marmelstein & Kubovcik

[57] ABSTRACT

A solar water heater comprises a platelike heat pipe having a working fluid enclosed therein. The heat pipe includes a heat collector having parallel tubular portions and a radiator having hollow portions in communication with the tubular portion. A hot water tank has a metal bottom plate and is placed on the radiator of the heat pipe. The heat pipe has a collector to radiator surface area ratio of from 3/2 to 9/1. The collector tubular portions are 10 to 500 mm in pitch. Each of the tubular portions is 5 to 150 mm² in cross sectional area. The head pipe may have a sacrificial protective layer and heat blocking holes. The main body of the hot water tank is jointed with a groove of the metal bottom plate using a sealant.

5 Claims, 12 Drawing Figures

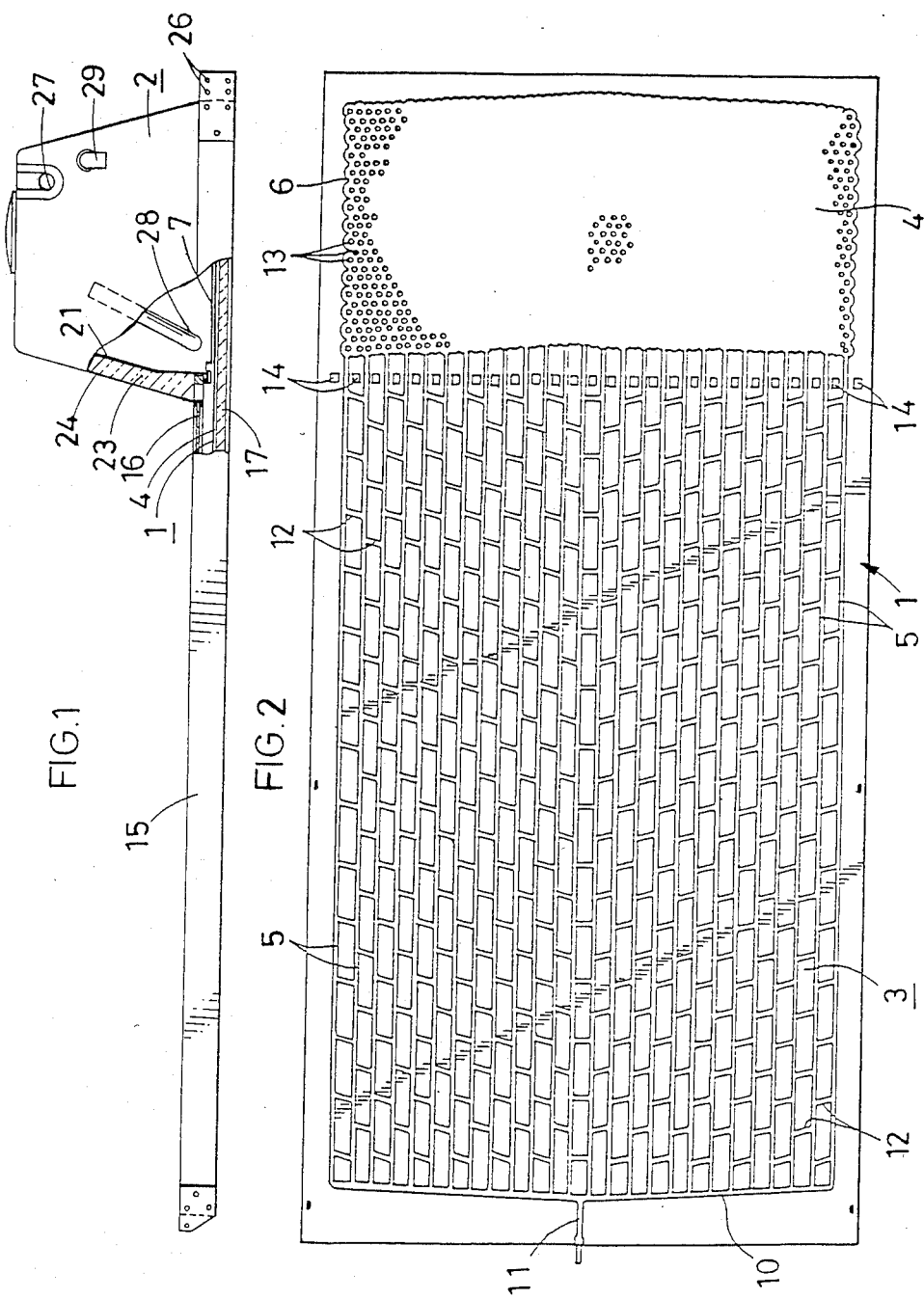

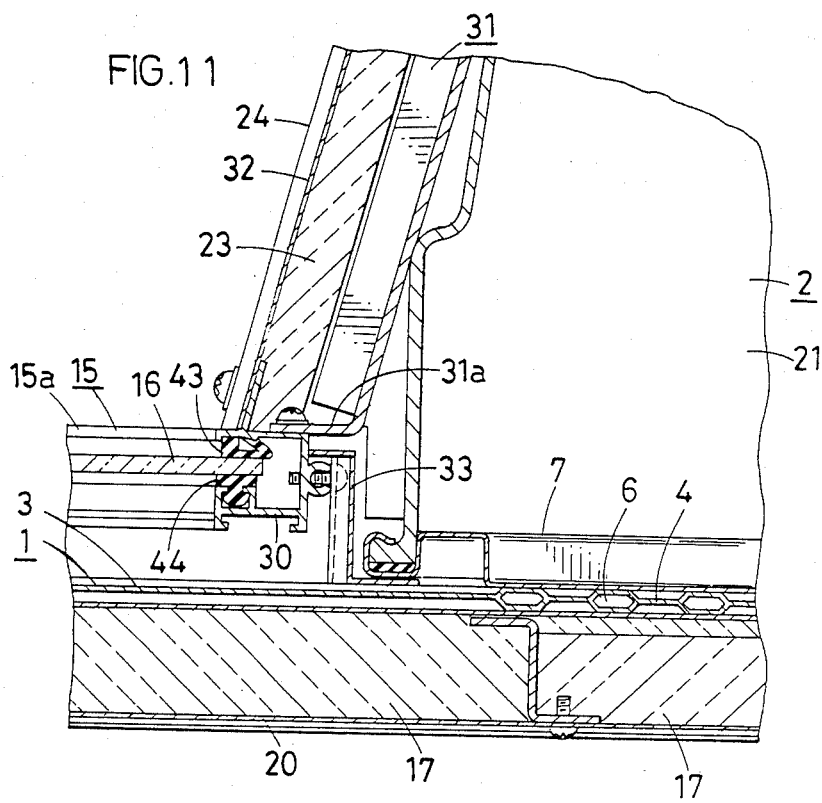
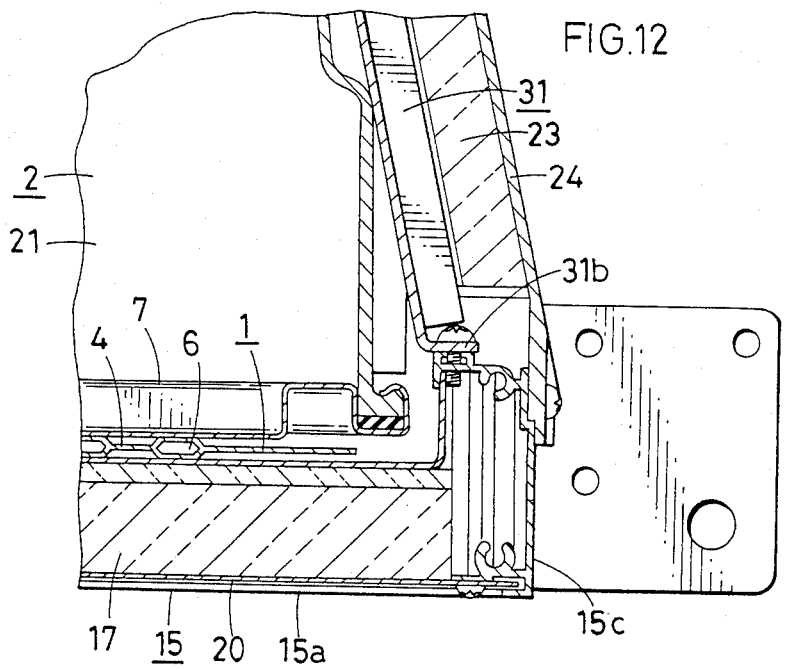

SOLAR WATER HEATER INCORPORATING HEAT PIPE

BACKGROUND OF THE INVENTION

The present invention relates to a solar water heater incorporating a heat pipe.

The solar water heaters of the type mentioned and heretofore known include those comprising a required number of heat pipes arranged in parallel. The heat pipes are provided with striplike fins and inserted, each at its one end, directly in a hot water tank. With the conventional solar water heater, therefore, the heat pipes must be attached to the hot water tank individually in a completely sealed state. The attachment of the pipes requires a difficult procedure and involves the likelihood that the water within the tank will leak due to improper sealing. Such heaters have another problem. If the inserted portion of the heat pipe ruptures within the hot water tank, the working fluid will flow into the tank, rendering the hot water unusable.

SUMMARY OF THE INVENTION

The present invention provides a solar water heater incorporating a heat pipe and free of the above problems.

The solar water heater of the present invention is characterized in that the heater comprises a platelike heat pipe having a working fluid enclosed therein. The heat pipe comprises a heat collector having parallel tubular portions and a radiator having hollow portions in communication with the tubular portions. A hot water tank has a metal bottom plate and is placed on the radiator of the heat pipe. The heat pipe has a collector to radiator surface area ratio of from 3/2 to 9/1. The collector tubular portions are 10 to 500 mm in pitch, each of the tubular portions being 5 to 150 mm² in cross sectional area.

The solar water heater of the present invention can be produced easily since the heat pipe can be attached to the hot water tank easily. The heat pipe has a great heat transfer capacity to provide hot water very efficiently. Furthermore, the heat pipe has high resistance to pressure and is therefore resistant to rupture. Even if the working fluid leaks due to a rupture of the heat pipe or some other cause, the fluid will not become mixed with the hot water in the tank. The hot water is therefore usable free of any trouble.

The present invention will be described in greater detail with reference to the accompanying drawings.

BRIEF DESCRIPTION OF THE DRAWINGS

FIG. 1 is a right side elevation partly broken away and showing a solar water heater incorporating a platelike heat pipe and embodying the invention;

FIG. 2 is an enlarged plan view showing the heat pipe only;

FIG. 11 is an enlarged view in section showing the front portion of the hot water tank of FIG. 9 as installed in place; and FIG. 12 is an enlarged view in section showing the rear portion of the same as installed in place.

DESCRIPTION OF THE PREFERRED EMBODIMENTS

The terms "front," "rear," "right" and "left" as used herein are based on FIG. 2. "Front" refers to the left side of FIG. 2, "rear" to the right side of the same, and "right" and "left" each refer to the corresponding side when the illustrated heater is seen from the front rearward.

Figure 3:
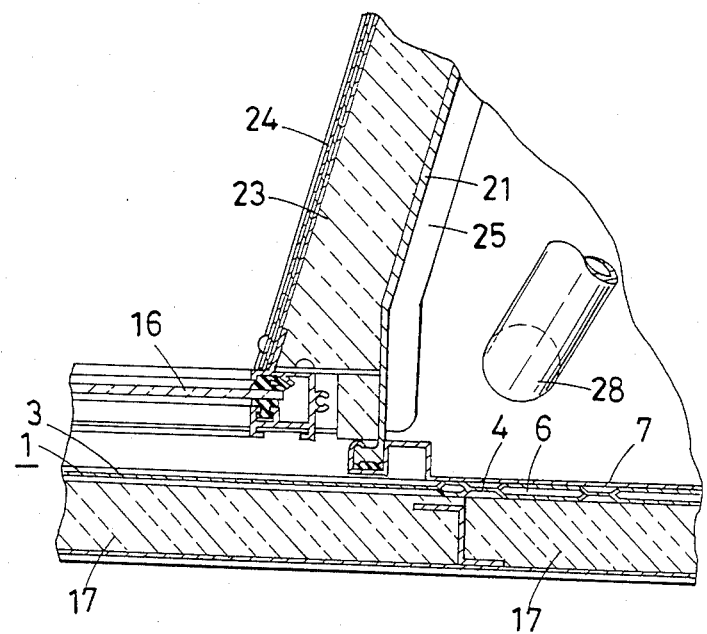
FIG. 3 is an enlarged fragmentary view in section showing the water heater of FIG. 1.

The solar water heater shown in FIGS. 1 to 3 comprises a platelike heat pipe 1 having a working fluid enclosed therein and a hot water tank 2 on the heat pipe 1. The heat pipe 1 comprises a heat collector 3 having parallel tubular portions 5, and a radiator 4 having hollow portions 6 in communication with the tubular portions 5. The hot water tank 2 is placed on the radiator 4 of the heat pipe 1 and has a metal bottom plate 7.

The platelike heat pipe 1 is composed of upper and lower two aluminum plates 8 and 9 which are roll-bonded to each other.

The heat collector 3 of the heat pipe 1 has the tubular portions 5 which are arranged in parallel and also straight from the front rearward, a header 10 connected to the front end of the arrangement of tubular portions 5, a working fluid inlet portion 11 at the front end of the heat pipe 1, and a multiplicity of channel portions 12 each holding two adjacent tubular portions 5 in communication. The channel portions 12 between the adjacent tubular portions 5 on the right side and left side of the inlet portion 11 are inclined toward the inlet portion 11. It is desirable that the tubular portions 5, as well as the channel portions 12, be large in number and small in cross sectional area and in spacing (pitch).

The radiator 4 of the heat pipe 1 has a multiplicity of small non-bulged portions 13 between the hollow portions 6 in communication with the tubular portions 5 and adapted to contact the bottom of the hot water tank 2. A hole 14 for preventing release of heat at nighttime is formed in each of the tubular portions 5 of the heat collector 3 which are positioned close to the radiator 4. A selective absorption film is formed over the surface of the collector 3.

The tubular portions 5, the header 10, the channel portions 12 and the hollow portions 6 have enclosed therein Freon or like working fluid for the assembly to act as a heat pipe.

The platelike heat pipe 1 has a collector (3) to radiator (4) surface area ratio of from 3/2 to 9/1. If the collector 3 is less than 60% and the radiator 4 is above 40%, the heat pipe 1 has a reduced heat receiving area, with the result that the heat pipe 1 itself needs to be made larger at an increased cost to assure the required heat receiving area. If the collector 3 is above 90% and the radiator 4 is below 10%, the solar heat received by the collector 3 will not be fully transferred to the hot water tank 2 via the radiator 4, hence a poor heat exchange efficiency. Such an area ratio involves increased thermal resistance, gives a greatly elevated temperature to the collector 3, permits the collector 3 to release an increased quantity of heat and is therefore undesirable.

The tubular portions 5 of the heat collector 3 are 10 to 500 mm, preferably 20 to 100 mm, in pitch. If the pitch of the tubular portions 5 is less than 10 mm, it becomes difficult to bond the upper and lower aluminum plates 8 and 9 into the platelike heat pipe 1. When the pitch exceeds 500 mm, the fin portions between the tubular portions 5 exhibit a poor heat transfer efficiency, and the number of tubular portions 5 per unit area decreases, seriously reducing the heat transfer capacity of the collector 3.

The tubular portion 5 of the collector 3 is 5 to 150 mm$^2$, preferably 10 to 50 mm$^2$, in cross sectional area. If the cross sectional area of the tubular portion 5 is less than 5 mm$^2$, an insufficient amount of heat transfer and a reduced heat transfer efficiency will result. When exceeding 150 mm$^2$ in this area, the tubular portion has an increased likelihood of deformation or rupture due to poor pressure resistance.

When the working fluid is to be placed into the heat pipe 1 through the inlet portion 11, the heat pipe 1 is positioned upright with the inlet portion 11 up, whereby the inside air is discharged by being replaced by the working fluid. Since the channel portions 12 are inclined toward the inlet portion 11, the air can be discharged very quickly, easily and completely.

The channel portion 12 has an angle of inclination of 10 to 50 deg, preferably 15 to 30 deg, with respect to a perpendicular at right angles with the axis of the tubular portion 5. If the angle of inclination is less than 10 deg, air will not be released completely when the heat pipe 1 is produced, and it is likely that the working fluid will not move smoothly under gravity during use of the solar water heater. If the angle is greater than 50 deg, it is impossible to provide the required number of channel portions 12, while it becomes difficult to give increased pressure resistance to the collector 3 since the channel portion 12 is oriented closer to the direction of the tubular portion 5.

The platelike main body of the heat pipe 1 is heated before the injection of the working fluid, the inlet portion 11 is sealed off after the injection, and the main body is subsequently cooled.

Since the collector 3 has the tubular portions 5 arranged in parallel and many channel portions 12, the heat pipe 1 is given increased strength against pressure due to work hardening when the roll-bonded material is bulged. The heat pipe 1 can therefore be effectively prevented from warping, distortion and local deformation, for example, even when it is used in the absence of water.

The presence of many channel portions 12 in addition to the parallel tubular portions 5 gives the heat pipe 1 an increased heat transfer capacity and greatly improved ability to collect heat. The tubular portions 5 and the channel portions 12, which are small in cross sectional area, impart greatly enhanced pressure resistance to the heat pipe 1 and assure quick transfer of solar heat from the surface of the collector to the inside working fluid with reduced heat losses and improved efficiency. With the inside air completely removed by the working fluid when it is placed in as already stated, the enclosed working fluid satisfactorily functions to exhibit improved heat collection performance.

Accordingly to the embodiment described above, the heat pipe 1 is made of a roll-bonded material, so that the multiplicity of inclined channel portions 12 can be formed for the parallel tubular portions 5 with use of a print pattern of a non-bonding agent for the production of the heat pipe 1, hence the advantage of low production cost.

Instead of using the roll-bonded material, the platelike heat pipe 1 may be prepared by bonding together two aluminum plates having the desired indentations formed by press work. The material is not limited only to aluminum but can be copper or some other metal.

The hot water tank 2 consists essentially of a box-shaped main body 21 having a bottom opening, the aforementioned metal bottom plate 7 for closing the opening, a heat insulation 23 covering the main body 21, a case 24 covering the insulation and reinforcing ribs 25 provide inside the main body 21. The tank 2 is fastened by screws 26 to opposite side frame members of a rectangular frame 15 for the water heater. The tank 2 is provided at its side portions with a water supply conduit 27, a hot water discharge conduit 28 and an overflow pipe 29. A glass plate 16 is provided over the collector 3 of the heat pipe 1 in parallel therewith. The heat pipe 1 has a heat insulation 17 on its bottom side.

Examples of useful material for the main body 21 of the hot water tank 2 are polyethylene, polypropylene, FRP and the like. The bottom plate 7 is made of stainless steel, copper, lining steel or the like.

The solar water heater of the construction described above is installed usually on the roof or the like in an inclined position with the tank 2 up. During daytime, therefore, the working fluid within the heat pipe 1 evaporates in the collector 3 at the lower side, flows into the radiator 4 at the upper side, undergoes condensation therein and then returns to the collector 3, thus transferring heat form the collector 3 to the radiator 4. During nighttime, on the other hand, the collector 3 has a lower temperature than the radiator 4, but the heat pipe 1 is unable to function and accordingly releases no heat since the heat pipe 1 is inclined as mentioned above. Because the collector 3 is formed in the portion thereof close to the radiator 4 with the heat blocking holes 14 arranged transversely of the heat pipe, the heat stored in the hot water tank 2 during daytime will not be smoothly released through the metal walls of the heat pipe 1 during nighttime. The holes 14 may be circular, or rectangular to square and is not specifically limited in shape. The larger the holes 14, the better, but the size of the holes 14 is suitably determined since if excessively large, these holes reduce the strength of the heat pipe 1.

Figure 4:
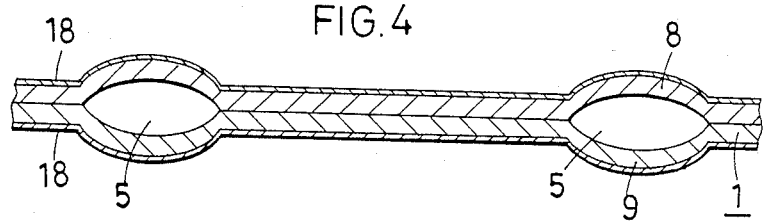
FIG. 4 is an enlarged view in section showing another example of platelike heat pipe.

FIG. 4 shows another embodiment of platelike heat pipe 1. With reference to this drawing, a sacrificial protective layer 18 made of an aluminum-zinc alloy for cathodic protection is formed over the surface of each of upper and lower aluminum plates 8, 9 of the heat pipe 1. The sacrificial protective layer 18 may be made of other alloy of aluminum and indium, tin, gallium or the like, or an aluminum alloy containing at least two of zinc, indium, tin, gallium and like metal, provided that the alloy acts to afford cathodic protection. The material for the aluminum plates 8 and 9 is pure aluminum or an alloy of aluminum and a metal other than those mentioned above.

When the heat pipe 1 is subjected to adverse conditions of high temperature and high humidity leading to promoted corrosion, the zinc in the sacrificial protective layers 18, 18 of Al-Zn alloy on the surfaces of the heat pipe 1 acts for sacrificial protection by cathodic protection, preventing corrosion from developing into the aluminum plates 8 and 9 forming the core. This precludes electrolytic corrosion of the radiator 4 of the heat pipe 1 and also obviates corrosion of the rear surface of the heat pipe 1 in contact with the heat insulation 17. When sacrificial corrosion occurs, the corroded portion becomes white, but this phenomenon is limited to the surface of the radiator 4 and the rear surface of the heat pipe 1. The dry surface of the collector 3 develops no sacrificial corrosion, therefore undergoes no color change and consequently produces no change in solar heat collection efficiency.

When the aluminum plates 8, 9 or the sacrificial protective layers 18, 18 are given an increased thickness, the durability of the heat pipe 1 can be increased remarkably.

While the sacrificial protective layer 18 is formed over the surface of each of the upper and lower aluminum plates 8, 9 of the pipe 1 according to the above embodiment, the protective layer 18 may be formed at least over the surface of the upper aluminum plate 8.

When at least the upper aluminum plate 8 of the heat pipe 1 is formed with the sacrificial protective layer 18 over its surface as described above, the heat pipe 1 can be given satisfactory heat transfer ability and effectively rendered free of surface corrosion and of electrolytic corrosion at the radiator 4 where different kinds of metals are in contact with each other. The protective layer therefore affords improved durability and obviates the likelihood of separation that would occur if the layer is formed by coating.

Figure 5:
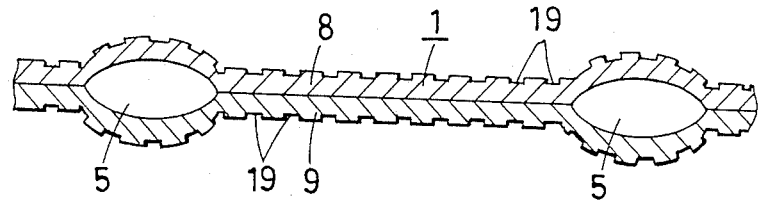
FIG. 5 is an enlarged view in section showing still another example of platelike heat pipe.

FIG. 5 shows another example of platelike heat pipe 1. With reference to this drawing, the heat pipe 1 is composed of upper and lower two aluminum plates 8 and 9, each of which has a multiplicity of indentations 19 formed by embossing in its surface. The two aluminum plates 8 and 9 are embossed simultaneously when they are bonded together under pressure. More specifically, the desired pattern of a non-bonding agent is printed on one of the two aluminum plates 8 and 9, and when the other plate is pressure-bonded to the printed surface, the two plates are embossed at the same time using embossing rolls. The multiplicity of indentations 19 thus formed preferably have a depth, for example, of about 100 μm and a length, for example, of about 1 to about 2 mm. The depth of the indentations 19 of course varies with the thickness of the plates, whereas if the depth is excessively large, the aluminum plates are likely to rupture when the assembly is bulged. The aluminum plates 8 and 9 are made of pure aluminum or an aluminum alloy.

Since the upper and lower two aluminum plates 8 and 9 of the heat pipe 1 are embossed, the plates are subjected to work hardening, which gives the heat pipe 1 greatly increased rigidity and enhanced strength against pressure. Consequently, when the platelike heat pipe 1 is placed into the case of the solar water heater and supported at two to three points spaced apart longitudinally of the pipe, no warping or distortion occurs, nor does any problem arise in respect of appearance. The work hardening of the aluminum plates 8 and 9 reduces the frictional resistance of their surfaces, while defacement, if any, will not show up due to the presence of the indentations or projections. Furthermore, the heat pipe 1 is not prone to local deformation or soiling or staining. For example, when such heat pipes 1 are stacked up for transport, an expanded synthetic resin sheet or soft interleaving paper may be placed between the pipes for protecting the selective absorption film formed on the surface, without the necessity of interposing a special sheet conventionally needed. The heat pipe can thus be handled with extreme ease. The indentations in the surface of the heat pipe 1 which is coated with the selective absorption film give an increased surface area to the pipe 1 for effective absorption of solar heat. When the platelike heat pipe 1 was actually tested as incorporated into a solar water heater, the pipe achieved a 2 to 3% higher heat collection efficiency than the conventional ones.

While both the aluminum plates 8 and 9 of the heat pipe 1 of the above embodiment have the multiplicity of indentations 19 formed in the surface by embossing, at least the upper aluminum plate 8 may have the indentations 19 formed by embossing in the surface.

Figure 6:
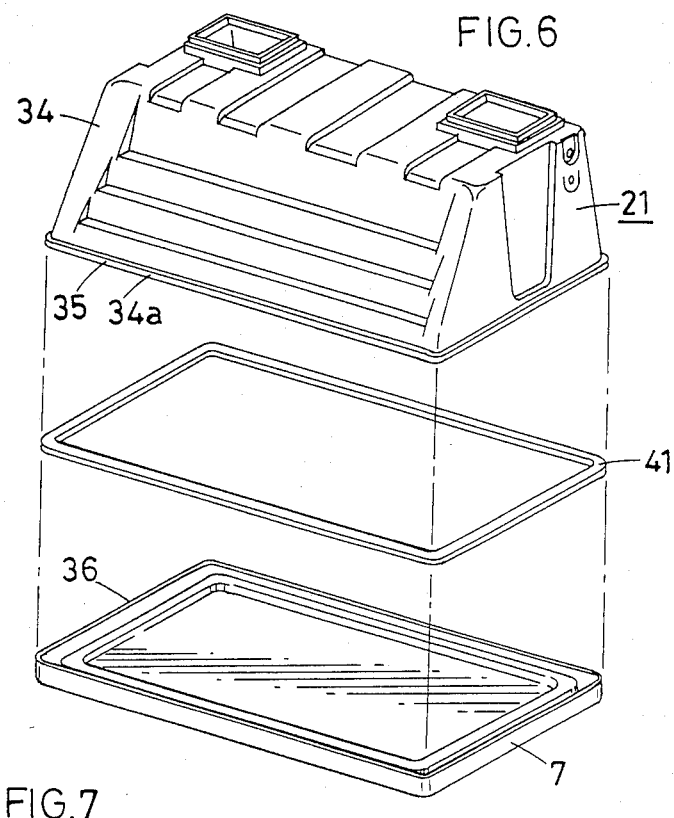
FIG. 6 is an exploded perspective view showing a hot water tank before being assembled.
Figure 7:
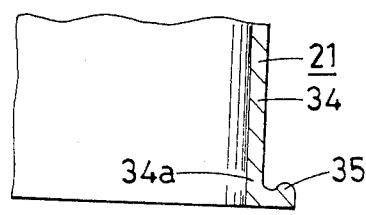
FIG. 7 is an exploded view in section showing the hot water tank being assembled.
Figure 8:
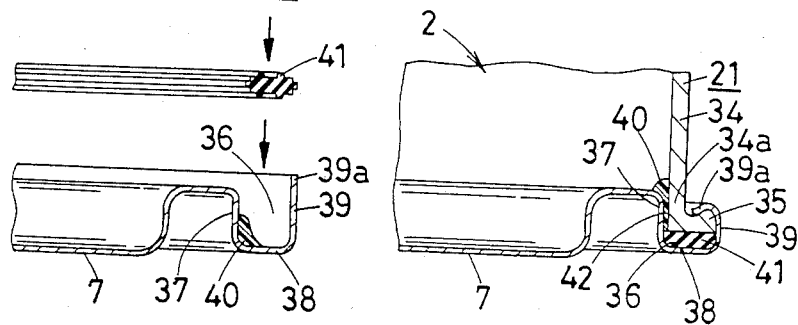
FIG. 8 is a sectional view showing the hot water tank as assembled.
Figure 9:
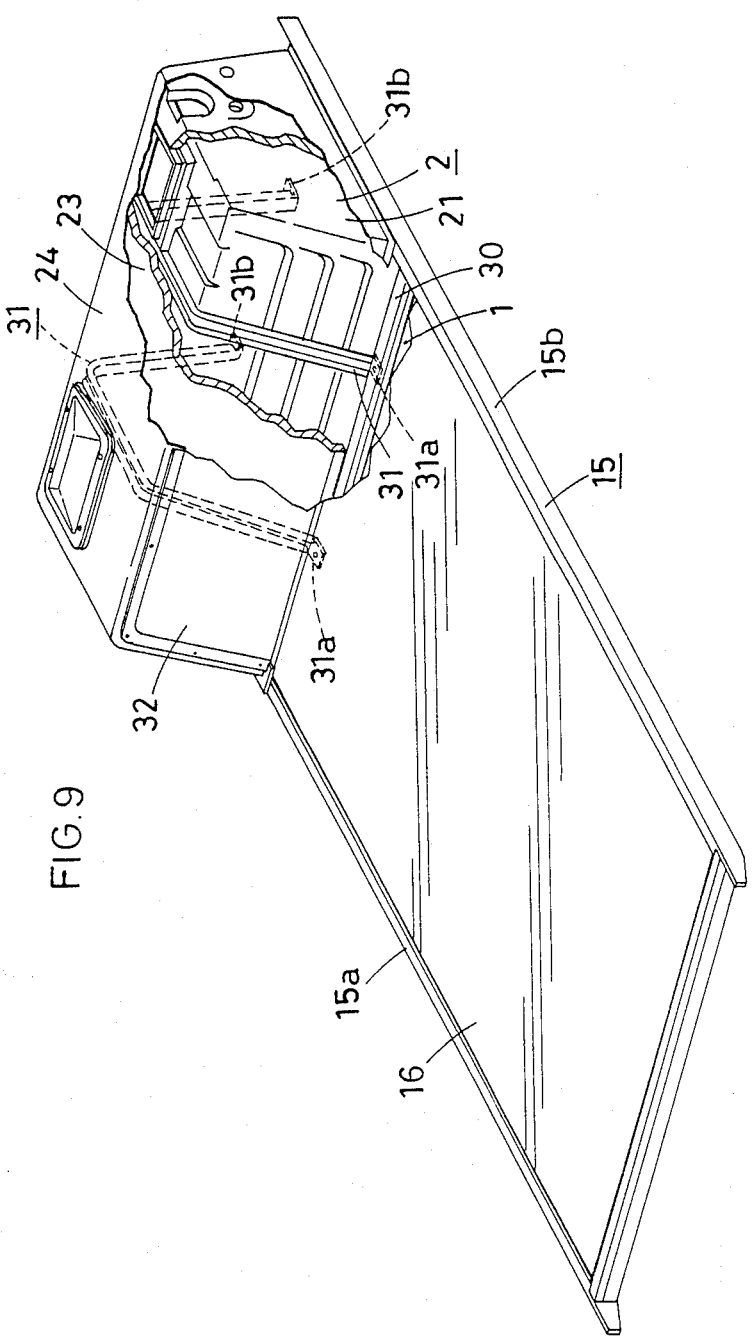
FIG. 9 is a perspective view partly broken away and showing another embodiment of solar water heater.
Figure 10:
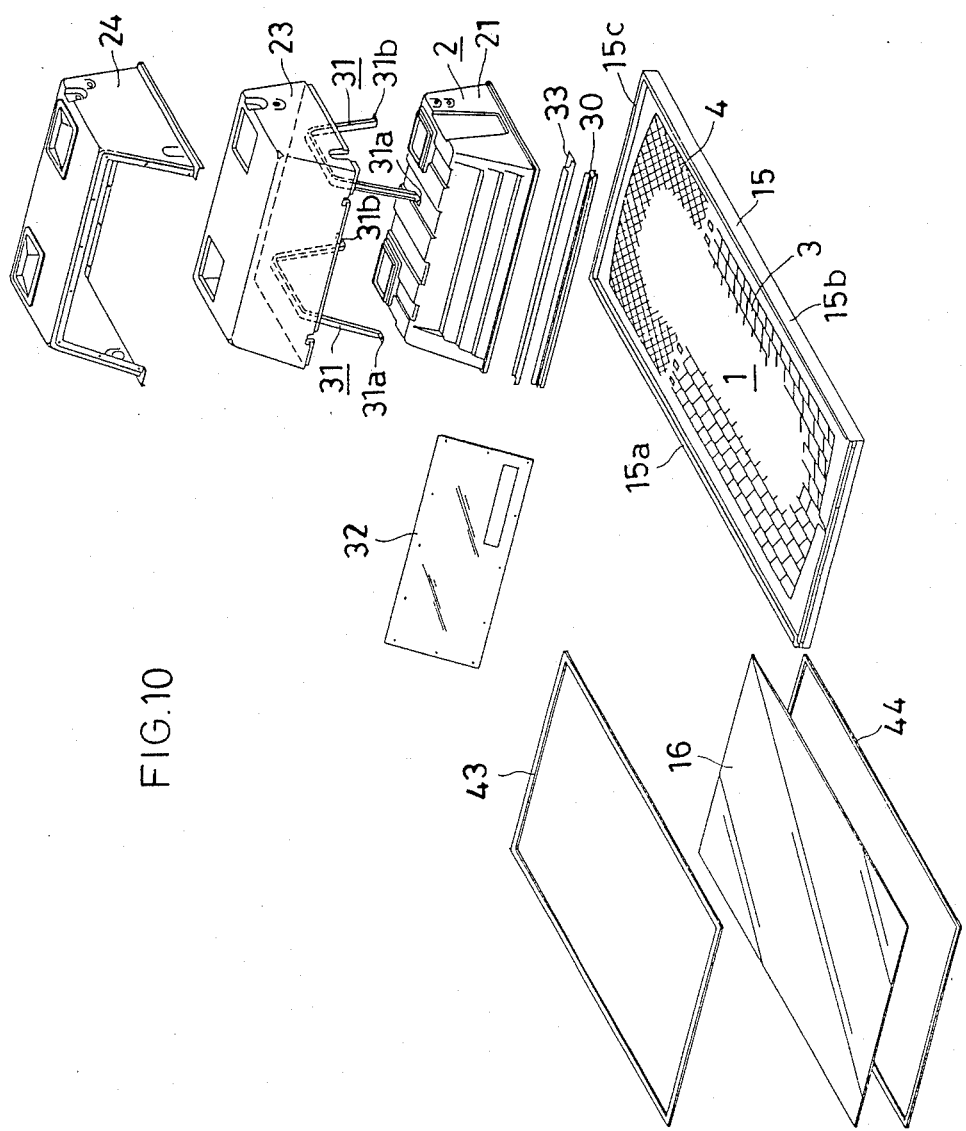
FIG. 10 is an exploded perspective view showing the same.

FIGS. 6 to 8 show how the hot water tank 2 is assembled. To assemble the main body 21 and the metal bottom plate 7 into the tank 2, the main body 21 has an outer projection 35 at the lower edge 34a of its peripheral wall 34, while the bottom plate 7 is formed along its peripheral edge with a groove 36 defined by an inside wall 37, a bottom wall 38 and an outside wall 39 (FIG. 6). A silicone sealant 40, which is flowable when not cured, is applied to the inside of the groove 36 at least at the corner between the inside wall 37 and the bottom wall 38. A silicone packing 41 is thereafter placed into the groove 36 over the sealant (FIG. 7). Subsequently, the lower edge 34a of peripheral wall of the main body 21 is fitted into the groove 36. The upper edge 39a of the outside wall 39 defining the groove 36 is crimped by a press or folded over the top of the outer projection 35, thereby forcing a portion of the sealant 40 into the clearance 42 between the inside wall 37 defining the groove 36 and the lower edge 34a of peripheral wall of the main body 21 to fill up the clearance 42 with the silicone sealant 40 (FIG. 8).

The silicone sealant 40 has heat resistance, is usable free of any problem under food sanitation regulations and is therefore desirable to use for the assembly. The silicone sealant 41 has good adhesion to the silicone packing 41 of like type and to the bottom plate 7 made of stainless steel or other metal, giving high bond strength when cured.

In some cases, other materials are usable as the sealant 40 and the packing 41.

When the hot water tank 2 is assembled by the above method, the peripheral edge portion of the metal bottom plate 7 can be completely prevented from corrosion at the clearance 42, giving greatly enhanced durability to the hot water tank 2. Since the sealant 40 is applied to the inside of the groove 36 before the bottom plate 7 is crimped or folded, the sealant 40 is applicable with greater ease and more readily than when the sealant 40 is filled into the clearance 42 after the main body 21 and the bottom plate 7 are assembled.

FIGS. 9 to 12 show another embodiment of the present invention, which differs from the embodiment of FIGS. 1 to 3 in respect of the means for fastening the hot water tank 21 in place.

The platelike heat pipe 1 and the hot water tank 2 are placed inside a rectangular aluminum frame 15 having a bottom wall 20. The tank 2 is placed on the radiator 4 at the rear end of the heat pipe 1. An intermediate transverse member 30 made of extruded aluminum and positioned along the lower edge of the front wall of the tank 2 extends between, and is attached to, opposite side frame members 15a, 15b of the frame 15. Two fasteners 31, 31 which are generally inverted U-shaped when seen sidewise are fitted over the hot water tank 2. These fasteners 31 are channel members. The opposed side walls of each fastener 31 are removed from the front and rear ends 31a, 31b thereof, where the bottom wall only projects. The front end 31a is bent and fastened to the transverse member 30 by a screw, while the rear end 31b is bent and fastened to the rear frame member 15c of the frame 15 by a screw.

The heat insulation 23 is placed over the hot water tank 2 from above the two fasteners 31, 31. The case 24 covering the insulation 23 has outer projections at the lower edges of its opposite side walls and of the rear wall and is fastened at these projections to the rectangular frame 15 by screws. The lower edge of the tank front wall is fastened at side portions to the transverse member 30 with screws. The case 24 has a front opening which is closed with a reflector panel 32. A water drop receptacle 33 is provided between the front wall lower edge of the hot water tank 2 and the transverse member 30 and is fastened to the member 30 with screws. The rear edge of the glass plate 16 is inserted in and attached to the transverse member 30 with upper and lower packings 43 and 44 interposed therebetween. The remaining three side edges of the glass plate 16 are attached to the rectangular frame 15 by unillustrated holders.

Although two fasteners 31 are used in the above embodiment, at least one, preferably 1 to 3, fasteners are used.

According to the embodiment described above, at least one fastener 31, which is approximately inverted U-shaped when seen from one side, is fitted over the hot water tank 2 and fastened at its opposite ends 31a, 31b to the transverse member 30 and the rear frame member 15c. Consequently, the hot water tank 2 can be firmly fastened to the rectangular frame 15 without permitting any deformation of the front wall of the tank 2 and the reflector panel 32, and further without impairing the appearance of the assembly. Moreover, the hot water 2 is prevented from falling off with greatly improved safety.

What is claimed is:

1. A solar water heater comprising:
   a platelike heat pipe having a working fluid enclosed therein, the heat pipe including a heat collector having parallel tubular portions and a radiator having hollow portions in communication with the tubular portions; and
   a hot water tank comprising a synthetic resin main body and a metal bottom plate, said hot water tank being placed on the radiator of the heat pipe, the heat pipe having a collector to radiator surface area ratio of from 3/2 to 9/1, the collector tubular portions being 10 to 500 mm in pitch, each of the tubular portions being 5 to 150 mm$^2$ in cross sectional area, the main body of the hot water tank having an outer projecting at a lower edge of a peripheral wall, the bottom plate being formed along a peripheral edge with a groove defined by an inside wall, a bottom wall and an outside wall, a sealant, flowable when not cured, being applied to an inside of the groove at least at a corner between the inside wall and the bottom wall, the lower edge of the main body peripheral wall being fitted in the groove with a packing placed between the bottom wall and the lower edge, an upper edge of the outside wall being folded inward in pressing contact with the outer projection, the sealant filling up a clearance between the inside wall and the lower edge of the main body peripheral wall.

2. A solar water heater as defined in claim 1 wherein the heat collector of the heat pipe has the parallel tubular portions as arranged straight from the front rearward, a header connected to the front end of the arrangement of tubular portions, a working fluid inlet portion having an opening at the front end of the heat pipe, and a multiplicity of channel portions each holding two adjacent tubular portions in communication, and the channel portions between the adjacent tubular portions on the right side and on the left side of the inlet portion are inclined toward the inlet portion.

3. A solar water heater as defined in claim 1 wherein the platelike heat pipe is composed of upper and lower two aluminum plates bonded to each other except at the tubular portions and the hollow portions, and at least the upper plate of the two aluminum plates is provided with a sacrificial protective layer over its surface.

4. A solar water heater as defined in claim 1 wherein the platelike heat pipe is composed of upper and lower two aluminum plates bonded to each other except at the tubular portions and the hollow portions, and at least the upper plate of the two aluminum plates has a multiplicity of indentations formed in its surface by embossing.

5. A solar water heater as defined in claim 1 wherein the platelike heat pipe and the hot water tank are placed inside a rectangular frame having a bottom wall, an intermediate transverse member interconnecting the opposite side frame members of the rectangular frame and extending along the lower edge of the front wall of the hot water tank, and at least one fastener generally inverted U-shaped when seen sidewise is fitted over the hot water tank, the fastener being fixed at its opposite ends to the intermediate transverse member and to the rear frame member of the rectangular frame.

* * * * *